United States Patent Office
3,334,584
Patented Aug. 8, 1967

3,334,584

PRODUCTION OF LITHOGRAPHIC PRINTING PLATES

Benjamin L. Sites, Elmhurst, Ill., assignor, by mesne assignments, to William C. Toland, St. Petersburg, Fla.
No Drawing. Filed Sept. 24, 1962, Ser. No. 225,846
9 Claims. (Cl. 101—456)

This invention relates to improvements in the production of printing plates and is more especially concerned with the preparation of plates which are useful in lithographic and allied printing operations. The invention also contemplates new and improved coatings for use in the production of said plates.

In the usual procedures for preparing lithographic printing plates of the so-called gelatin colloid plate type, a light sensitive gelatin coating, in the form of a solution of gelatin in water to which a hardener such as formaldehyde and a sensitizer such as sodium potassium or ammonium bichromate are added, is deposited upon a printing plate base, which may be any suitable surface such as grained zinc or grained aluminum. The plate is then exposed under a negative to actinic light to provide hardened ink receptive printing portions and water-swellable nonprinting portions.

The deficiencies of such printing plates have been well recognized by those versed in the art. Such plates must be used promptly upon their production, great care and rigid controls must be exercised in their production and use, they can be employed for only relatively short runs, for instance, of the order of 3,000 or 4,000, and they must be operated on the press at relatively high room temperatures and conditions of humidity. This humidity is obtained, in the usual case, in either of one of two ways. Either water is applied to the plate or the printing operation must take place at exceedingly high conditions of relative humidity and, as indicated above, at elevated temperatures. These latter conditions of operation make for considerable discomfort for those persons who are required to work in such environments.

The over-all situation is that, despite certain potential advantages in the use of gelatin as a coating material for sensitized printing plates and the like, its disadvantages have been so many and of such character that, except for certain special types of printing operations, it has fallen into substantial disuse.

In accordance with the present invention, which is described hereafter in detail, radical improvements have been effected which very significantly increase the utility of gelatin printing plates and make possible results which were never previously achieved.

It has been well known in the art dealing with reproductive processes where sensitized gelatin coatings or, for that matter, other sensitized colloids, were used, that negatives containing any reasonable range of tone values would result in the loss of either the highlight tones or the filling in of the denser tones. This has been especially true in the case of gelatin emulsions whether sensitized with light-sensitive chromic salts such as the bichromates or, for that matter, with other sensitizers including, for instance, silver salts. It has, therefore, been a very definite requirement, among other things, in the making of plates utilizing gelatin sensitized coatings, that the negative be very flat (i.e. have a short range in density between the highlight and shadow areas) in order to obtain even reasonably satisfactory results. The highlights contrast out completely if a great number of tone values is present in the original negative, and this generally has been the basis of all photographic processes both with reference to negatives and prints. In accordance with the present invention, plates are produced which provide extremely accurate reproduction or duplication of details which, in accordance with prior procedure utilizing heretofore known gelatin printing plates, have been lost.

Printing plates made in accordance with the present invention are substantially non-reticulated. The grain pattern, in the plates of the present invention, may amount to as many as 3,000,000 per square inch but each is essentially individual as may be shown by examination under magnification. This results in eliminating the very deep shadows and the pure highlights which have been a part of all previous commercially used reproduction processes. Non-reticulated gelatin printing plates have allegedly heretofore been obtained as described, for instance, in Patent No. 1,453,259. The procedures described in this patent have long been known but it has repeatedly been demonstrated that such known procedures are characterized by important disadvantages so that much has been left to be desired with respect to actual commercial practices following the teachings of said patent. In any event, it is impossible to obtain the results achieved by the present invention by following the procedures described in said patent. The gelatin printing plates which have heretofore gone into any appreciable commercial use have been of the distinctly reticulated type, the face of the plate reticulated being in proportion to the exposure of light. The lithographic printing plates made in accordance with the present invention are of the intaglio character, printing taking place from the bottom and the holes or apertures which hold the ink vary in depth with the degree of light penetration.

The method for preparing the radically improved lithographic printing plates of the present invention involves, in general, in its particularly preferred embodiments, forming an aqueous solution or emulsion containing the product or products of the reaction of gelatin, sorbitol, oxalic acid, and an alkali tetraborate such as potassium tetraborate, coating said emulsion on a base member, drying said coating, contacting said coated base member with an aqueous sensitizer solution containing a light sensitizer such as silver compounds, dyes such as diazo dyes but particularly a water-soluble chromic salt such as ammonium or sodium or potassium bichromate, and then drying said plate in a dark room or under a light which is not actinic to the sensitized emulsion. The plate is then ready for use at which time it is exposed for a period of time determined by the nature of the photographic transparency, generally, for a matter of seconds to minutes. After exposure, the plate is developed or washed in water until all of the unreacted bichromate sensitizer is removed and it is then dried. This washing step is commonly completed in from 10 to 15 minutes when the invention is practiced in contrast to a time period of approximately 2 hours in conventional present day operations. Before placing the plate on the press, said plate may be soaked in an aqueous solution of glycerin, the excess squeegeed off, and the plate is then ready for the press.

The following example is illustrative of a particularly preferred embodiment of the invention. It will be understood that said example is not to be construed as limitative of the scope of the invention since, in the light of the guiding principles and teachings provided herein, various changes and modifications will be apparent to those versed in the art.

*Example*

A composition containing the following ingredients was prepared in the manner described in detail below:

| | | |
|---|---|---|
| Gelatin | grams | 400 |
| Arlex | cc | 160 |
| Oxalic acid | grams | 8 |
| Potassium tetraborate | do | 20 |
| Water (filtered) | cc | 3080 |

(1) 400 grams of gelatin flakes were placed in a 3000 cc. beaker, the gelatin was wetted with 600 cc. of water and then allowed to stand until all of the water was adsorbed by the gelatin flakes, and the mixture was well stirred.

(2) 80 cc. of water were added to 160 cc. of "Arlex" (a commercial form of sorbitol in the form of an aqueous solution consisting of D-sorbitol with an approximately equal amount of other polyhydric alcohols, essentially isomers and anhydrides of sorbitol, the polyhydric alcohol content being 83.0± 0.1%) (Atlas Chemical Industries, Inc.), the resulting solution was added to the composition of part 1 with good stirring, and allowed to stand for 5 to 10 minutes.

(3) 2400 cc. of water was measured out and a portion thereof was added to the composition of part 2, sufficient to cover said composition (the remainder of said water being reserved for further use as described below).

(4) The beaker containing the composition of part 3 was placed in a water bath previously brought to 150° F. to raise the contents of said beaker to about 150° F. to dissolve the gelatin. Then, the reserved water from part 3 was added from time to time, keeping the gelatin covered at all times. When the gelatin began to warm up and go into solution, all of the remaining water, except 600 cc. thereof, was added, the mixture being heated to about 150° F. to form a clear solution without lumps.

(5) The 600 cc. of water, not used in part 4, was divided into two equal portions of 300 cc. To one of said 300 cc. portions 8 grams of oxalic acid were added; and, to the other of said 300 cc. portions, 20 grams of potassium tetraborate were added.

(6) To the composition of part 4, the solution of the oxalic acid produced in part 5 was added with stirring until a uniform precipitate was formed throughout, and then the solution of the potassium tetraborate produced in part 5 was added, with stirring, to form a homogeneous emulsion. This emulsion, which had a pH of 5, was then poured into a 1 gallon brown bottle, allowed to stand until it reached room temperature, and was then placed in a refrigerator to protect it against bacterial or other contamination. The emulsion is preferably allowed to remain in the refrigerator at least 12 hours before it is used.

(7) The composition of part 6 was poured at a temperature of about 60 to 65 degrees C. onto a hot, grained wet aluminum plate, whirled in a conventional whirler at 100 r.p.m. for approximately 90 seconds, and was then set aside, flat, until the coating set, after which it was dried. The drying may be effected in any convenient manner as, for example, by simple air drying or by fan drying.

(8) The resulting dried coated plate was then dipped into an aqueous solution containing the light sensitizer. It is preferred to use a simple aqueous solution of ammonium bichromate, for instance, a water solution containing from 3% to 4% of ammonium bichromate. After allowing the plate to soak in said light sensitizer solution, the plate was removed and dried under a non-actinic light.

(9) The plate was now ready for exposure. In this connection, as is well understood in the art, the exposure time is determined, among other things, by the character of the transparency utilized, said exposure time varying from a number of seconds to minutes depending, for example, upon the density of the transparency. After exposure to actinic light under a negative, the plate was developed or washed in cold (55 degrees F. or lower) water until all of the unreacted ammonium bichromate was removed. The plate was then air dried.

(10) The plate produced in part 9 hereof was then soaked in glycerin, a step which, per se, is well known in the art. In this example, a solution of 1 part glycerin and 2 parts water was used although the concentration of glycerin can be widely varied, and the soaking of the plate in the glycerin solution was for a period of about 20 minutes although, here, again, the soaking time is quite variable. The excess glycerin solution was then squeegeed off the plate. The plate was now finished and ready for placing on the press.

In actual runs, under conditions of about 50% relative humidity and with application of water on the press, in excess of 15,000 prints have been made with no scumming of the plate and with the prints exhibiting outstanding clarity and detail. The plate prints effectively immediately upon its completion and placement on the press and continues so to print even after it has been stored over periods of several weeks without any special reprocessing of the plate other than a resoaking in an aqueous solution of glycerol.

The procedures described in detail above are, of course, subject to wide variation.

Thus, for instance, the sensitized coating composition can be applied to any suitable surface as, for instance, to zinc, steel, glass, porcelain, celluloid, paper, regenerated cellulose, cellulose ether and cellulose ester sheets, and the like. Advantageously, in the case of metals, the plate is grained in accordance with conventional techniques but this is not essential to the practice of the invention. The sensitized coating may vary in thickness but especially good results are obtained with coating thicknesses of the order of 0.0002 to 0.0005 inch.

The sorbitol serves a number of important functions. It appears to form a complex with the oxalic acid and the gelatin which acts as a reservoir for water, holding the water absorbed and gradually releasing it at an effective rate so as to prevent scumming and to make possible the obtaining of large numbers of impressions and outstandingly good storage life of the plates. The sorbitol, further, acts as a controlled but very slight hardener for the gelatin. It appears, also, to impart toughness to the gelatin film.

In place of sorbitol, other sugar alcohols can be used such as mannitol, dulcitol and arabitol. Furthermore, other water-soluble polyhydric alcohols containing at least 3 hydroxyl groups and generally from 3 to 8 hydroxyl groups, such as glycerol and polyglycerols, for instance, diglycerol, triglycerol and tetraglycerol or mixtures thereof can be used in place of sorbitol. The use of sorbitol, however, is especially efficacious and its utilization in the environment here involved represents an important, though limited, embodiment of the present invention.

In place of oxalic acid, other water-soluble polycarboxylic acids can be used as, for instance, succinic acid, tataric acid, and citric acid. Oxalic acid, however, gives outstandingly satisfactory results and its use, in the present environment, represents an especially important embodiment of this invention.

In the making of the plate, as described above, the order of mixing of the ingredients may be varied, but it is particularly preferred, for best results, that the procedure described be followed.

It is particularly advantageous to utilize the tetraborates in combination with the oxalic acid, in the manner described above, because better highlights and tone values appear to be obtained as a result thereof. The tetraborate also provides an effective means to control the pH of the emulsion within desired limits. Other alkalies can be used for control of the pH but it is preferred to use mild alkalies and especially tetraborates.

It may be pointed out that it has heretofore been known in the art dealing with photographic processes to react gelatin with small proportions of oxalic acid and no novelty is asserted in any such broad procedures. In such prior procedures, the reaction between the gelatin and oxalic acid has been carried out in a manner whereby the effect of the treatment of the gelatin with oxalic acid has been such that, when utilized in conjunction with an alkali metal bichromate sensitizer, the image formed is practically water-impenetrable but so grease-repellent that the coatings do not accept greasy developing inks readily and tend to refuse ink on the press.

In carrying out the treatment for the modification of the gelatin in accordance with this invention, the gelatin, in the form of a dilute solution in water, as stated above, reacts with the oxalic acid, preferably dissolved in the minimum amount of water in which the requisite amount of oxalic acid can be used is soluble. The concentration of gelatin in water is variable, good results being obtained with an aqueous solution containing 1 part of gelatin to from about 5 to about 15 parts of water, said parts being by weight. It is very satisfactory to make a solution of 1 part of gelatin in about 9 or 10 parts of water and, for ease of handling, to maintain the solution at slightly elevated temperatures. It is especially advantageous that the oxalic acid solution be added to the gelatin solution, with agitation after the inclusion of the sorbitol in the solution. The amount of oxalic acid is somewhat variable, from about 1.5% to about 6%, usually about 2% to 3.5%, producing good results, said percentages being by weight of the gelatin contained in said gelatin solution.

With respect to the coating compositions, the pH thereof should be below 7 and it is especially desirable that the pH thereof be below 6, for instance, about 5 to 5.2, since the plates coated with such solutions stand up in storage over prolonged periods of time.

The coating compositions advantageously contain from about 8% to 15% of gelatin, from about 0.1% to 0.3% of oxalic acid, from about 2% to 5% of sorbitol, and from about 0.4% to 1% alkali metal tetraborate where used, and the balance, from about 90% to 80%, water.

While the light sensitizer solution into which the previously coated dried plates are dipped may comprise only a simple water solution of the light-sensitizer, particularly a bichromate such as ammonium bichromate, it may also contain supplemental ingredients for obtaining special effects as, for instance, organic optical brighteners and light absorbers.

For obtaining certain effects, organic optical brighteners or light absorbers can be incorporated into the light sensitizer compositions into which the coated plates are dipped. The proportions of said optical brighteners or light absorbers are variable but, in general, will fall within the range of 0.05% to 0.1%, based on the weight of the gelatin. Typical of such optical brighteners or light absorbers which, per se, are well known as such in the art and are commonly used in compositions for the treatment of cloth fabrics are, for instance, such products as are sold under the trade names of Uvitex P, Uvitex RS, Uvitex WGS, Uvitex WS (Ciba Pharmaceutical Products, Inc.), Tinopal (Geigy Co., Inc.), Solium (Lever Brothers Company), Univul MS-40, Univul DS-49, and Blancophor DS-86 (General Aniline & Film Corporation), Cyasorb UV-24 (American Cyanamid Company), and TBS (Dow Chemical Company). Various of them comprise umbelliferone and stilbene derivatives typical examples of which are disclosed, for instance, in U.S. Patent No. 2,528,323. Such and equivalent compounds, which are also disclosed in various other U.S. patents, have heretofore commonly been used to impart a whitening effect to textile materials, paper and the like. The said optical brighteners and light absorbers operate to provide unusually effective high lights and fine details and third dimensional characteristics in the prints made from the plates and they function, in the same general connection, as light restraining agents.

As has previously been pointed out, printing plates made in accordance with the present invention, as described above, for use particularly in the lithographic industry, have a number of significant advantages. Overexposures of substantial magnitude do not, in many cases, adversely affect the details of the finished prints. However, overexposures should be avoided where vignetting into white is desired. Truer reproduction than has heretofore been possible with existing printing plates of the colloid type is obtained. In previous plates of the gelatin colloid type, the images, after a reasonable run, have a tendency to sharpen with the result that prints are made which do not carry a true tone value of the original copy. Where, however, the teachings of the present invention are used, the result is to obtain true images with sharp detail and high tonal values which hold through many thousands of impressions without sharpening. In the printing plates of the present invention, the transmission of light through the sensitized and developed coating is in substantially straight lines as contrasted with the light spreading which has been characteristic of heretofore produced reticulated gelatin printing plates.

While the particularly significant features of this invention center around improvements in lithographic printing plates, various of the teachings provided herein are of substantial value in other fields. One example is in connection with X-ray films. Present types of X-ray films are essentially color-blind emulsions which are particularly sensitive to ultra-violet rays in the short end of the spectrum. Such X-ray films, like all other films, are subject to a certain amount of expansion of the image which has a tendency to destroy the detail. By application of coatings such as have been described above, but utilizing silver salt sensitizers, new types of X-ray films can be prepared which are capable of carrying very substantially more detail than is now achievable with present X-ray films. The necessity for effective detail is particularly important in order to enable the medical profession to obtain more accurate and definite diagnoses. The use of coatings made in the manner described above, and depositing the resulting coatings on X-ray types of film materials makes possible marked improvements.

The invention also has applicability to the microfilm field where, again, detail is particularly important. The use of the coating compositions of this invention, followed by suitably chosen sensitizers, such as are used in microfilm, open up new avenues for improvements in this particular area.

Still another field in which the teachings of this invention can be expected to play a definite role is in the amateur photography field. Here, amateurs can be supplied with plates made in accordance with this invention and, by the proper application of known chemicals, there can be made with such plates one's own colored prints. Such prints are capable of being made in size and quantity which, in comparison with present methods, sharply reduce the cost. Thus, for instance, for an extra print all that would be involved would be only the cost of a small amount of printing ink plus a sheet of paper coupled with the amateur or hobbyist's labor. The size is controlled solely by the enlarging equipment. A degree of color correction can be obtained by the use of single masks which the amateur or hobbyist can make from his color separations.

What is claimed as new and desired to be protected by Letters Patent of the United States is:

1. A substantially non-reticulated gelatin printing plate, said plate, after exposure to light and development, comprising an only partially hardened coating supported on a base member, said coating carrying moisture and a reacted light sensitizer and comprising a complex resulting from the reaction of gelatin and a water-soluble polycarboxylic acid in the presence of a water-soluble polyhydric alcohol containing from 3 to 8 hydroxy groups.

2. A substantially non-reticulated gelatin printing plate, said plate, after exposure to light and development, comprising an only partially hardened coating supported on a base member, said coating carrying moisture and a reacted light sensitizer and comprising a complex resulting from the reaction of gelatin and a water-soluble polycarboxylic acid in the presence of a water-soluble polyhydric alcohol containing from 3 to 8 hydroxy groups, and an alkali metal tetraborate.

3. A substantially non-reticulated gelatin printing plate, said plate, after exposure to light and development, comprising an only partially hardened coating supported on a base member, said coating carrying moisture and a reacted bichromate light sensitizer and comprising a complex resulting from the reaction of gelatin and oxalic acid in the presence of sorbitol and potassium tetraborate.

4. As a new article of manufacture, a base member, a substantially non-reticulated gelatin coating supported on said base member, said coating carrying moisture and sorbitol and including a complex resulting from the reaction of gelatin and oxalic acid, said coating carrying on its outer surface an exposed and developed light sensitizer, said coating being characterized by its ability to transmit light therethrough in substantially straight lines as contrasted with light spreading characteristic of reticulated gelatin printing plates.

5. As a new article of manufacture, a base member, a substantially non-reticulated gelatin coating supported on said base member, said coating carrying moisture, sorbitol, potassium tetraborate, and including a complex resulting from the reaction of gelatin and oxalic acid, said coating carrying on its outer surface an exposed and developed ammonium bichromate, said coating being characterized by its ability to transmit light therethrough in substantially straight lines as contrasted with light spreading characteristic of reticulated gelatin printing plates.

6. In a method of preparing lithographic printing plates, the steps which include forming an aqueous solution containing gelatin and sorbitol, adding an aqueous solution of oxalic acid thereto, then adding an aqueous solution of an alkali metal tetraborate, then coating the resulting composition on a base member, and drying said coating.

7. The method of claim 6, which includes contacting said dried coated base member with an aqueous solution containing a bichromate light sensitizer, and drying.

8. In a method of preparing lithographic printing plates, the steps which comprise wetting gelatin with water, adding a water solution of sorbitol to said wetted gelatin, adding additional water gradually and raising the temperature of the resulting mixture to about 150 degrees F. to dissolve the gelatin and to produce a substantially clear solution, adding a water solution of oxalic acid, with stirring, whereby a substantially uniform precipitate is formed, and then adding, with stirring, a water solution of potassium tetraborate, whereby to form an essentially homogeneous emulsion.

9. In a method of preparing lithographic printing plates, the steps which comprise wetting gelatin with water, adding a water solution of sorbitol to said wetted gelatin, adding additional water gradually and raising the temperature of the resulting mixture to about 150 degrees F. to dissolve the gelatin and to produce a substantially clear solution, adding a water solution of oxalic acid, with stirring, whereby a substantially uniform precipitate is formed, then adding, with stirring, a water solution of potassium tetraborate, whereby to form an essentially homogeneous emulsion having a pH of about 5 to 6, and then coating the resulting composition on a base member.

References Cited

UNITED STATES PATENTS

| | | | |
|---|---|---|---|
| 1,756,951 | 5/1930 | Meyer et al. | 101—149.4 |
| 2,294,429 | 9/1942 | Stutz | 106—208 X |
| 2,532,866 | 12/1950 | Toland et al. | 96—33 |
| 2,584,030 | 1/1952 | Land | 96—29 |
| 3,012,886 | 12/1961 | Lerner | 96—33 |
| 3,042,514 | 7/1962 | Roth | 96—29 |
| 3,046,128 | 7/1962 | Klimkowski et al. | 96—49 |
| 3,169,065 | 2/1965 | Sorkin et al. | 96—35 X |

OTHER REFERENCES

Asperger: Chem. Abstracts, Col. 6496(c), vol. 45, No. 14, July 25, 1951.

NORMAN G. TORCHIN, *Primary Examiner.*

A. LIBERMAN, D. PRICE, C. L. BOWERS, Jr., *Assistant Examiners.*